Sept. 16, 1969  A. H. LOWE  3,467,430
DOUBLE GLAZING UNITS
Filed Aug. 1, 1967  3 Sheets-Sheet 3

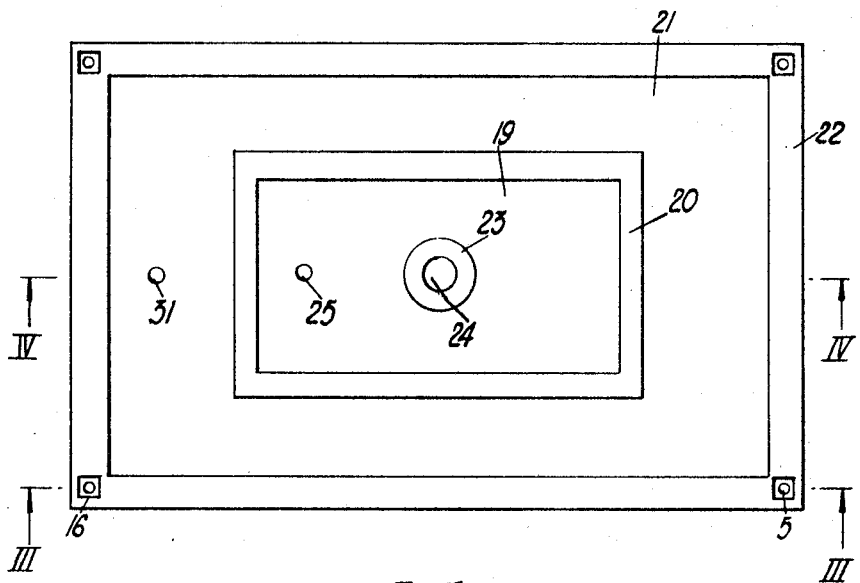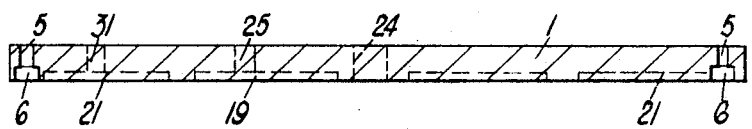

Inventor
Albert Henry Lowe
By
Morrison, Kennedy & Campbell
Attorneys

United States Patent Office 3,467,430
Patented Sept. 16, 1969

3,467,430
DOUBLE GLAZING UNITS
Albert Henry Lowe, St. Helens, England, assignor to Pilkington Brothers Limited, Liverpool, Lancashire, England, a corporation of Great Britain
Filed Aug. 1, 1967, Ser. No. 657,624
Claims priority, application Great Britain, Aug. 8, 1966, 35,443/66
Int. Cl. B66c 1/02; A47b 97/00; C03c 27/00
U.S. Cl. 294—65                                       1 Claim

ABSTRACT OF THE DISCLOSURE

Vacuum holding apparatus for engaging the upper surface of a sheet of glass comprises a main clutch platen, and an auxiliary holding platen matching the size of the sheet to be held, which holding platen is clutched by vacuum to the clutch platen.

BACKGROUND OF THE INVENTION

Field of the invention

This invention relates to the manufacture of peripherally welded double glazing units and more especially to vacuum holding apparatus for engaging the upper surface of a sheet of glass in order to hold and lift the sheet of glass in the course of manufacture of a welded double glazing unit.

Description of the prior art

In known processes for the manufacture of peripherally welded double glazing units the upper sheet of glass is engaged by a vacuum platen which lifts the upper sheet a predetermined distance above the lower sheet to establish the desired interspace between the sheets, and the peripheral edges of the top sheet of glass are fused into those of the lower sheet of glass when the upper sheet has been lifted to the desired spacing above the lower sheet of glass. The upper glass when engaged by the vacuum platen closes a cavity formed in the lower face of the platen and the evacuation of this obturated cavity by connection to a source of vacuum enables the platen to hold and lift the upper glass sheet.

The peripheral welding operation requires that the margins of the upper sheet of glass shall project beyond the edges of the glass-holding plates, for example by up to as much as 1 inch all round, and it has been customary to adapt the vacuum holding apparatus for the manufacture of different sizes of double glazing units by gripping an adaptor platen of appropriate dimensions against the under face of a clutch platen by means of a vacuum applied to the clutch platen, vacuum being transmitted to the lower face of the adaptor platen in order to hold a glass sheet against the adaptor platen with the correct marginal overlap.

It has only been possible to manufacture a limited range of sizes of double glazing units with this arrangement without the dismantling and replacing of the clutch platen.

The dismantling has been necessary in order to fix to the usual hydraulic lifting device a clutch platen adapted to hold a different range of sizes of adaptor platens appropriate to the manufacture of another limited range of sizes of double glazing units.

The use of replaceable clutch platens not only increases the capital cost of the plant, but also means that the plant is out of action during the dismantling and changeover of platens.

It is a main object of the present invention to provide vacuum holding apparatus which is sufficiently flexible in use to enable it to be adapted easily to the manufacture of double glazing units of any of the required commercial sizes, without dismantling of the holding apparatus being necessary.

A further object of the invention is to provide means for controlling the holding force exerted on a sheet holding platen by a backing clutch platen so that the holding force between the two platens can be varied depending on the weight and size of the sheet of glass being held and lifted.

SUMMARY

According to the invention there is provided vacuum holding apparatus for engaging the upper surface of a sheet of glass in order to hold and lift the sheet in the course of manufacture of a welded double glazing unit, comprising a clutch platen which is recessed in a prescribed area thereof, there being at least one passageway through the platen communicating with that recessed area and arranged for connection to a vacuum source through a selectively operable valve, and a sheet-holding platen having a flat back for obturating said area of the lower face of the clutch platen, there being an aperture through the sheet-holding platen for registering over an aperture in the clutch platen which aperture is separately connectable through a valve to a vacuum source, the lower face of the holding platen being indented to distribute over that face a glass sheet holding suction applied through said apertures when the holding platen is clutched to the clutch platen by the connection of said passageway to a vacuum source.

In a preferred embodiment of the invention vacuum holding apparatus for engaging the upper surface of a sheet of glass in order to hold and lift the sheet in the course of manufacture of a welded double glazing unit, comprises a clutch platen whose lower face is formed with a central cavity defined by a continuous wall separating the central cavity from an outer cavity completely surrounding the central cavity, there being passageways through the platen individual to and communicating with each platen, which passageways are arranged for connecting to a vacuum source through selectively operable valves, and a sheet holding platen having a flat back for obturating the central cavity in the lower face of the clutch platen there being an aperture through the sheet holding platen for registering over an aperture in the clutch platen which aperture is separately connectable through a valve to the vacuum source, and the lower face of the holding platen being grooved to distribute over that face a glass sheet-holding suction applied through said apertures when the holding platen is clutched to the clutch platen by evacuation of at least the central cavity in the clutch platen.

The provision of holding cavities which are completely separate from each other in the underneath of the clutch platen means that a large range of sheet-holding platens can be employed with the same clutch platen fixed to the hydraulic lifting arrangements. When double glazing units of the smaller sizes, e.g. down to 15 inches by 15 inches are being made the sheet holding platen obturates the central cavity only, and this central cavity must be dimensioned so as to grip a sheet-holding platen for the smallest size of glazing units being manufactured. For larger sizes, e.g. up to 70 inches by 50 inches, the sheet-holding platen covers both cavities and is held against the clutch platen by the evacuation of one or both of the cavities. For even greater flexibility there may be more than one outer cavity, each cavity surrounding another, and having its individual valve-controlled connection to the vacuum source.

Usually the shape of the platens and the form of the cavities in the clutch platen is dictated by the external shape of the double glazing units being manufactured.

Most usually the platens are of rectangular shape and the wall delimiting the central cavity is of rectangular form symmetrical about a central boss formed in the lower face of the clutch platen, which boss is formed with a bore constituting the aperture in the clutch platen with which the aperture in the sheet holding platen registers.

Preferably the grooves formed in the lower face of the sheet-holding platen are symmetrically distributed over that face, and all parts of the grooves communicate with the central aperture in the sheet-holding platen. This distributes the holding vacuum over the face as uniformly as possible when the grooves are continuously evacuated through the central aperture.

The easily demountable sheet-holding platen acting as an adaptor for the main clutch platen, enables the apparatus to lift sheets of glass of different lengths and widths not commensurate with the shape of the cavities on the clutch platen, and even enables the sheet-holding platen to lift sheets of glass of dimensions smaller than the smallest cavity formed in the lower face in the clutch platen. The sheet-holding platen may extend beyond the outer dimensions of the main platen and so hold and lift sheets of glass larger than the clutch platen.

BRIEF DESCRIPTION OF THE DRAWINGS

FIG. 2 is an underneath plan view of the clutch platen, FIG. 3 is a section on line III—III of FIG. 2.

DESCRIPTION OF THE PREFERRED EMBODIMENT

Figure 1:
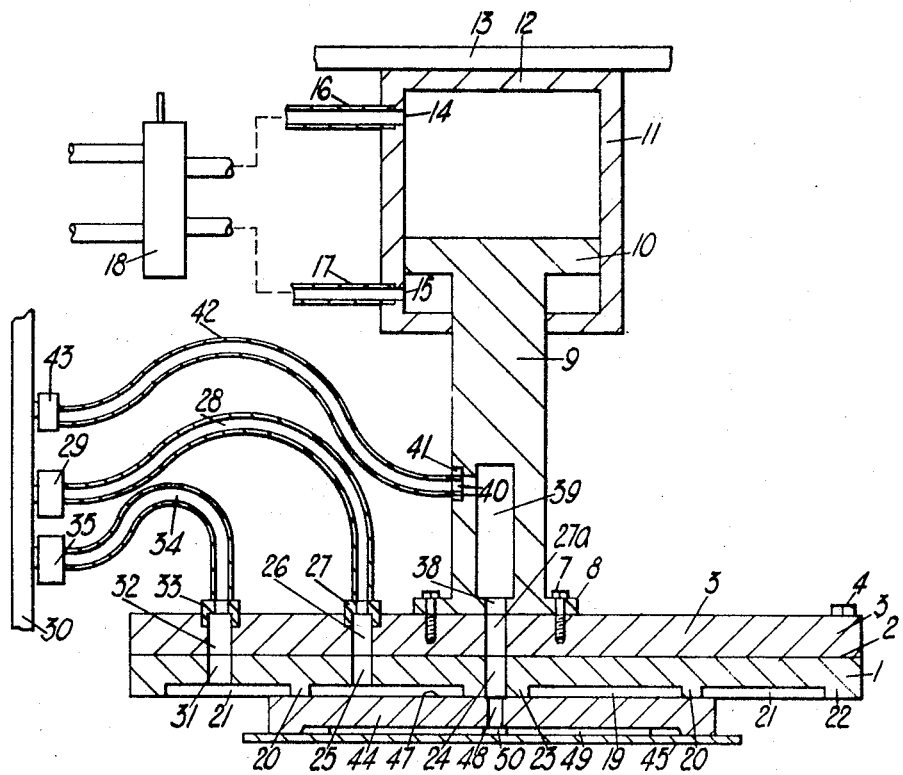
FIG. 1 is a centre line section on a longitudinal axis through vacuum holding apparatus according to the invention, illustrated by way of example, showing a clutch platen fixed to the bottom of a piston and gripping a sheet-holding platen against its lower face, which sheet-holding platen in turn holds a sheet of glass.

Referring to the drawings vacuum holding apparatus for engaging the upper surface of a sheet of glass in order to lift the sheet in the course of manufacture of a welded double glazing unit, includes a clutch platen 1 of refractory material, e.g. fused silica material, which has a flat upper face 2 secured against the lower face of a flat steel backing plate 3 by means of bolts whose heads are shown at 4 and which pass downwardly through bores 5 in the backing plate 3 and the corners of the clutch platen 1 as indicated in FIGS. 2 and 3. The bolts engage in nuts, not shown, which are located in recesses 6 which terminate the bores 5 in the lower face of the platen 1, so that the lower face of the platen is not obstructed by the nuts on the ends of the fixing bolts.

The backing plate 3 is secured by bolts 7 to a flange 8 on the lower end of a piston 9. The head 10 of the piston is slidably mounted in a cylinder 11, and the head 12 of the cylinder is secured to a fixed part 13 of the machine frame. There are ports 14 and 15 formed in one side of the wall of the cylinder which ports are connected by conduits 16 and 17 through a spool valve 18 to a source of hydraulic pressure fluid. When fluid is supplied through one of the conduits 16, 17 the other acts as the exhaust. The supply of pressure fluid through conduit 16 depresses the piston, and the supply fluid through conduit 17 raises the piston.

The lower face of the clutch platen 1 which is for engaging the flat back surface of an auxiliary platen which holds a sheet of glass is recessed to form with two shallow cavities namely a central cavity 19 whose limits are defined by a continuous wall 20 of rectangular form symmetrically disposed about the centre of the plan view of the platen 1. The wall 20 separates the central cavity 19 from an outer cavity 21 which completely surrounds the central cavity and the outer cavity 21 is itself surrounded by a wall 22 forming the outer wall of the underface of the platen 1. It is through this outer wall 22 that the bores 5 are formed.

The central cavity 19 is so formed that it leaves a central boss 23 in the middle of the platen and there is a central aperture 24 through this central boss. The function of this central aperture in conducting holding suction to the upper surface of a glass sheet is described below. The lower surfaces of the outer wall 22, the inner wall 20 and the central boss 23 all lie in the plane of the working surface of the underface of the clutch platen.

Figure 4:
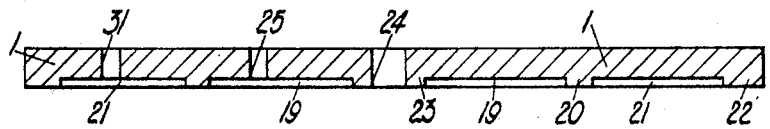
FIG. 4 is a section on line IV—IV of FIG. 2.

Communicating with the central cavity 19 there is a passageway 25 formed through the thickness of the platen (FIG. 4). The passageway 25 registers with a passageway 26 formed through the backing plate 3, and a coupling 27 fixed in the top of the passageway 26 enables that passageway to be connected by a flexible suction duct 28 to a valve 29 which controls the application of vacuum from a vacuum pump manifold indicated at 30 to the central cavity 19 through the duct 28 and the passageways 25 and 26 under control of the valve 29. The outer cavity 21 communicates with an individual passageway 31 formed through the thickness of the platen 1 and registering with a passageway 32 formed through the thickness of the backing plate 3. The top of the passageway 32 is provided with a coupling 33 which connects a flexible suction duct 34 to the passageways 32 and 31. The duct 34 is connected to a control valve 35 which is also connected to the vacuum pump manifold 30 so that the evacuation of air from the outer cavity 21 can be effected under control of the valve 35.

The central aperture 24 formed through the boss 23 in the centre of the clutch platen 1 registers with a central aperture 27a formed in the backing plate 2 which also registers with an orifice 38 formed in the centre of the flange 8 on the end of the piston, which orifice communicates with a chamber 39 formed centrally in the piston rod. There is a port 40 in the upper end of this chamber passing through to the outside of the piston rod and a coupling 41 fixed in the outside of the port enables a flexible suction duct 42 to be connected to the chamber 39. The duct 42 is connected through a control valve 43 to the vacuum pump manifold 30.

The clutch platen 1 serves to hold an interchangeable glass sheet-holding platen 44 whose dimensions suit the size of the double glazing unit being manufactured, allowing the marginal overlap of the glass sheet already described. The sheet holding platen 44 which is also made of a refractory material e.g. fused silica obturates the central cavity 19 in the clutch platen 1 but the lower face of the auxiliary platen may be adapted for the holding and lifting of sheets of glass which are even smaller than the outer dimensions of the wall 20 defining the central cavity 19.

In the embodiment illustrated in FIG. 1 the auxiliary sheet-holding platen 44 is in position clutched to the platen 1 and holding a sheet of glass 45 which is marginally larger than the outer dimensions of the platen 44.

Figure 5:
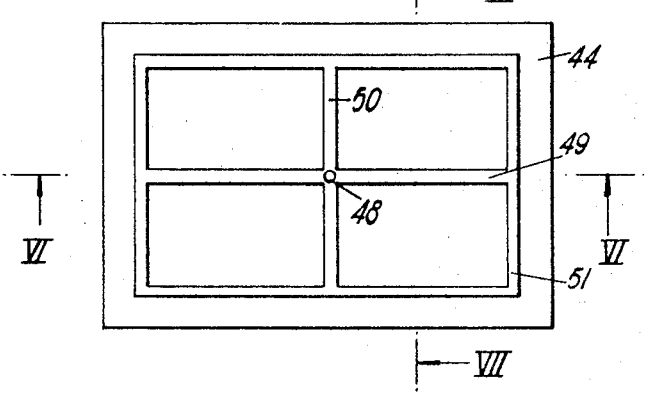
FIG. 5 is an underneath plan view of the sheet-holding platen shown in FIG. 1.
Figure 6:
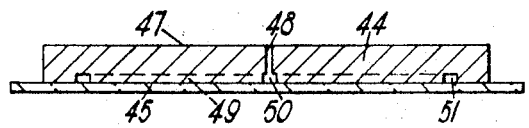
FIG. 6 is a section on line VI—VI of FIG. 5.
Figure 7:
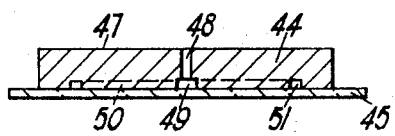
FIG. 7 is a section on line VII—VII of FIG. 5.

The sheet-holding vacuum platen 44 is also illustrated in FIGS. 5, 6 and 7 and has a flat back face 47 for engaging the whole of the continuous wall 20 which delimits the central cavity 19 in the lower face of the clutch platen 1. The flat back face 47 of the holding platen 44 closes off the central cavity 19. There is a central aperture 48 in the platen 44 which registers with the central aperture 24 formed through the boss 23 in the clutch platen, and the sheet-holding platen 44 is held against the lower face of the main platen by suction, by operation of the valve 29 to connect the vacuum pump 30 through the duct 28 and the passageways 26 and 25 to the central cavity 19 of the platen 1.

The lower face of the sheet holding platen 44 is indented by grooves in order to distribute over that platen a sheet-holding suction applied through the central aperture 48 and the chamber 39 when the valve 43 is opened. One example of the formation of grooves in the lower face of the platen 44 is illustrated in FIGS. 5, 6 and 7. The central aperture 48 has communicating with it cruciform grooves 49 and 50 which communicate near the periphery of the platen with an outer groove 15 which extends right around the platen although spaced inwardly from the outer edge of the platen. All these grooves are in communication with each other and with the central aperture 48 so that when the vacuum pump is connected to the chamber 39 there is uniform suction over these grooves and a sheet of glass indicated at 45 is held by the suction against the lower face of the platen 44 with the marginal edges of the sheet projecting beyond the outer dimensions of the platen so that these marginal areas which are painted with electrically conductive stripes and are softened by electrical heating in the welding operation can droop freely and curve downwardly under the action of gravity as the edges of the upper sheet fuse to the edges of the lower sheet to form the desired peripheral weld, both sheets of glass having already been preheated before the upper sheet is lifted by the vacuum holding apparatus to the desired spacing above the lower sheet of glass. This gives the desired thickness of interspace inside the double glazing unit. The distribution of suction over the underface of the sheet-holding platen 44 by means of the grooves, which may be supplemented by further branch grooves which have been omitted for the sake of clarity, ensures a substantially uniform support for all the central part of the upper sheet of glass which is to form one face of the double glazing unit. This support for that upper sheet is maintained after the peripheral weld is completed until the welded edges of the unit have stiffened sufficiently to hold their shape and to maintain the desired spacing and parallelism between the upper and lower sheets of glass.

The sheet-holding platen shown in FIG. 1 is for use in the manufacture of small double glazing units and provides the necessary marginal overhang of the glass sheet even though the sheet is much smaller than the clutch platen.

Auxiliary sheet-holding platens 44 for the entire range of sizes of double glazing units offered commercially may be clutched to the underface of the clutch platen 1, and the clutch platen 1 and its backing plate 3 do not have to be unbolted from the flange 8 on the piston when there is a change of size on the production line.

When the outer dimensions of the holding platen 44 are smaller than the dimensions of the clutch platen, the holding platen is gripped to the clutch platen 1 by suction in the cavity 19 only, by operation of the valve 29.

For the manufacture of large size double glazing units, the sheet holding platen may be of such a size that it completely closes both the inner and outer cavities formed in the lower surface of the clutch platen 1, and may even project well beyond the edges of the clutch platen. The force gripping the holding platen 44 is then provided by the vacuum in both the inner and outer cavities 19 and 21 and this holding force is sufficient both to grip the larger sheet-holding platen 44 to take the weight of the sheet of glass which is sucked against the lower face of the platen 44.

When larger size double glazing units are being manufactured the large sheet-holding platen which projects beyond the edges of the clutch platen 1 is held by suction force generated in two independent vacuum cavities and should a valve or a duct fail then both vacuum sources do not fail at the same time but the platen 44 and the sheet of glass may continue to be held by suction in one or other of the cavities 19 and 21.

By the invention therefore, the vacuum holding arrangements can be adapted to the many different sizes of double glazing units manufactured commercially by the use of interchangeable sheet-holding platens embracing the whole commercial range of sizes of double glazing units without the necessity for dismantling the main vacuum platen and replacing it by a platen of a different size.

I claim:
1. Vacuum holding apparatus for engaging the upper surface of a sheet of glass in order to hold and lift the sheet in the course of manufacture of a welded double glazing unit, comprising a clutch platen having a bottom face formed with a first recess in a central area and a second recess in the outer surrounding area separated from said first recess by a continuous wall, said recesses when obturated being capable of maintaining a vacuum-established therein, and said clutch platen having a first passageway communicating with said first recess, a second passageway communicating with said second recess, and a third passageway opening in an unrecessed portion of said bottom face, a sheet holding platen having top and bottom faces, said top face engaging the bottom face of the clutch platen and, depending upon the dimensions of the glass sheet to be processed, being of a size to obturate only said first recess or both said first and said second recesses, and said bottom face engaging the glass sheet, said sheet holding platen having recesses in said bottom face for distributing a sheet holding suction over the surface of a sheet of glass in engagement therewith when connected with a vacuum source and having a passageway communicating at one end and with said recesses and at its other end with the third passageway in the clutch platen, and means for selectively establishing a vacuum through said first passageway or through said first and second passageways respectively to hold in operative position a sheet holding platen which obturates said first recess only or both said first and second recesses and for establishing a vacuum through said third passageway for holding a glass sheet in position on the sheet holding platen.

References Cited
UNITED STATES PATENTS

| | | | |
|---|---|---|---|
| 2,799,205 | 7/1957 | Bagsik | 248—363 X |
| 3,268,316 | 8/1966 | Snyder | 65—152 X |
| 3,272,611 | 9/1966 | Jorgensen | 294—64 X |

EVON C. BLUNK, Primary Examiner

D. D. WATTS, Assistant Examiner

U.S. Cl. X.R.
65—152